United States Patent
Schmid et al.

(10) Patent No.: US 9,579,844 B2
(45) Date of Patent: Feb. 28, 2017

(54) METHOD FOR COATING COMPONENTS

(75) Inventors: Johannes Schmid, Starzach (DE); Klaus Reich, Lossburg (DE); Achim Gauss, Dornstetten (DE)

(73) Assignee: HOMAG HOLZBEARBEITUNGSSYSTEME AG, Schopfloch (DE)

(*) Notice: Subject to any disclaimer, the term of this patent is extended or adjusted under 35 U.S.C. 154(b) by 61 days.

(21) Appl. No.: 13/394,965

(22) PCT Filed: Feb. 22, 2011

(86) PCT No.: PCT/EP2011/052623
§ 371 (c)(1),
(2), (4) Date: Mar. 30, 2012

(87) PCT Pub. No.: WO2011/101494
PCT Pub. Date: Aug. 25, 2011

(65) Prior Publication Data
US 2012/0305168 A1 Dec. 6, 2012

(30) Foreign Application Priority Data
Feb. 22, 2010 (DE) .......... 10 2010 008 821

(51) Int. Cl.
*B27N 7/00* (2006.01)
*B27D 5/00* (2006.01)
(Continued)

(52) U.S. Cl.
CPC ............ *B29C 63/003* (2013.01); *B27D 5/003* (2013.01); *B29C 63/48* (2013.01); *B29L 2007/002* (2013.01)

(58) Field of Classification Search
CPC .. B27N 7/00; B27D 5/00; B27D 5/003; B29C 63/003; B29C 63/48
(Continued)

(56) References Cited

U.S. PATENT DOCUMENTS 3,749,592 A * 7/1973 Gaske et al. ............ B05D 3/06
427/506
4,222,812 A * 9/1980 Duewel .................. B27D 5/003
156/497
(Continued)

FOREIGN PATENT DOCUMENTS

DE 195 43 901 A1 5/1996
DE 19543901 A1 5/1996
(Continued)

OTHER PUBLICATIONS

"Rigid." Merriam-Webster.com. Merriam-Webster, n.d. Web. May 19, 2014. <http://www.merriam-webster.com/dictionary/rigid>.*
(Continued)

*Primary Examiner* — Michael N Orlando
*Assistant Examiner* — Elizabeth Bradford
(74) *Attorney, Agent, or Firm* — Scott R. Cox

(57) ABSTRACT

A method for coating workpieces (10), preferably in sheet form, which preferably consist at least in certain portions of wood, wood-based materials, plastic or the like, with the following method steps: providing a workpiece (10) having at least one workpiece surface (12), in which the workpiece surface (12) is improved by applying at least a first curable liquid to the workpiece surface (12) and at least partially curing the first liquid (16); exposing the workpiece (10) to energy, at least on the workpiece surface (12) and/or a coating (14) that is intended to be applied to the workpiece surface (12); and applying the coating (14), in particular of an edge (14), to the liquid-coated workpiece surface (12) and preferably pressing the edge (14) onto a liquid-coated workpiece surface (12).

11 Claims, 3 Drawing Sheets

(51) Int. Cl.
  *B29C 63/00* (2006.01)
  *B29C 63/48* (2006.01)
  *B29L 7/00* (2006.01)

(58) Field of Classification Search
  USPC ........................................................ 156/272.2
  See application file for complete search history.

(56) References Cited

U.S. PATENT DOCUMENTS

| | | | |
|---|---|---|---|
| 6,180,172 | B1 | 1/2001 | Hasenkamp et al. |
| 2008/0193785 | A1 | 8/2008 | Kingma et al. |
| 2008/0239042 | A1* | 10/2008 | Gauss et al. .................. 347/101 |

FOREIGN PATENT DOCUMENTS

| | | |
|---|---|---|
| DE | 19518925 A1 | 11/1996 |
| DE | 102006056010 A1 | 7/2007 |
| DE | 102006021171 A1 | 11/2007 |
| EP | 1 068 026 B1 | 3/2003 |
| EP | 1068026 B1 | 3/2003 |
| EP | 2110228 A1 | 10/2009 |
| GB | 1 516 562 A | 7/1978 |
| GB | 1516562 A | 7/1978 |
| GB | 1 546 518 A | 5/1979 |
| GB | 1546518 A | 5/1979 |
| WO | 2006117163 A1 | 11/2006 |
| WO | WO-2006/117163 A1 | 11/2006 |
| WO | 2007021235 A1 | 2/2007 |
| WO | WO-2007/021235 A1 | 2/2007 |

OTHER PUBLICATIONS

DE19518925 (published as EP0744260) English machine translation, Nov. 1996.*
Corresponding international search report dated Jun. 21, 2011.

* cited by examiner

METHOD FOR COATING COMPONENTS

CROSS-REFERENCE TO RELATED APPLICATIONS

This application is a 371 U.S. National Stage of International Application No. PCT/EP2011/052623, filed Feb. 22, 2011, and claims priority to German patent application No. 10 2010 008 821.8, filed Feb. 22, 2010, the disclosures of which are herein incorporated by reference in their entirety.

TECHNICAL FIELD

The present invention relates to a method for coating components, in particular flat or three-dimensionally shaped components which consist at least in certain portions of wood, wood-based materials, plastic or the like. Although mainly continuous methods are described in the following, in which the relevant workpieces 10 are moved continuously or quasi-continuously, the present invention can also be used with stationary workpieces, with workpieces moved in the stop-and-go process or combinations hereof.

Coating in this application is understood to be a permanent coating material, such as a strip-shaped narrow surface coating of plastic or real wood veneer (with limited elastic deformability). Such a coating material is referred to in the following as an edge banding.

PRIOR ART

Flat workpieces of compressed materials (e.g. chipboards) which have a rough or porous surface structure on the cut narrow surfaces of the workpiece are processed in the furniture industry in particular. Various methods have become established in the prior art for coating these narrow workpiece surfaces. The known methods have the shared problem that the coating should be thin for cost, processing efficiency and visual reasons but unevenness of the workpiece's narrow surface should not show through the coating on the outside.

EP 1 068 026 B1 discloses a method and a system for applying lacquer in which a layer of lacquer to be applied is adapted to the surface profile of the surface to be coated by applying an adapted quantity of lacquer. In addition, a system for applying lacquer to narrow workpiece edges is described in which a unit for metering the lacquer is provided in such a manner that a layer of lacquer is provided between the unit for metering the lacquer and the roller for applying lacquer.

Known coating apparatuses for applying edge bandings use adhesive which is applied to either the narrow workpiece surface or the edge banding. The term adhesive is used so generally within the scope of this application that it is intended to include all liquid adhesive agents, such as glue too. In this case, the edge banding is commonly unwound from a roll as a strip and is pressed onto the narrow workpiece edge. Heat is frequently applied to activate the adhesive.

With the cold-activation method, the adhesive or glue is activated upstream of the pressing zone via heat-emitting systems (hot-air blower, contact rolls, infra-red emitters, etc.). After adjusting the adhesiveness, the coating is pressed onto the possibly preheated narrow surface. Here too the adhesive is either applied to the narrow workpiece surface shortly before activation or it is applied to the coating material as a preliminary coating.

In practice it has been shown that the type of heat input has a major effect on the coating result. On one hand, the intention is to prevent adverse effects, such as physical or chemical changes on the workpiece, the coating or the adhesive, from occurring due to too steep a rise in temperature while on the other hand sufficient heat input is required to activate the adhesive.

The trend is also towards carrying out edge banding gluing using as little adhesive as possible so that as a result the edge banding can lie very closely against the workpiece surface and therefore, seen from the flat areas of the workpieces, the glue layer is barely visible between the glued edge banding and the workpiece surface. It has been shown that the type of heat input has a particularly significant effect on the edge banding result especially when using small amounts of adhesive.

The use of a laser for exposure to energy, particularly heating of the workpiece surface or edge banding, has proven to be expedient as an advantageous technique for heat input that is particularly easy to adapt. In this case, the laser is guided in a path-like pattern over the workpiece surface or edge banding making the desired temperature rise achievable. The amount of heat introduced can be scaled flexibly via the laser power, feed speed and path distance.

It has been shown that particularly when applying flexible edge bandings with low material thickness to workpieces with coarsely structured workpiece surfaces, these structures show up on the glued-on edge bandings such that they are then visible from the outside. This is an undesirable impairment of the visual appearance. Nevertheless, there is a desire to process edge bandings with a low material thickness since they present advantages with regard to the visual appearance that can be achieved, they are easy to process, inexpensive and therefore offer economic advantages.

PRESENTATION OF THE INVENTION

The object of the present invention is therefore to make available a method for coating workpieces which eliminates the disadvantages referred to. The method according to the invention should also achieve the object of inexpensively coating coarsely structured workpiece surfaces with coatings, in particular edge bandings, that have a low material thickness using only a small amount of adhesive or glue while achieving a good visual appearance.

This object is achieved according to the invention by a method with the features of claim 1. The subordinate claims contain advantageous configurations of and improvements to the invention.

A method according to the invention for coating preferably flat workpieces, which preferably consist at least in certain portions of wood, wood-based materials, plastic or the like, is carried out in a plurality of process steps. First of all, a workpiece that has at least one workpiece surface is provided. The workpiece surface is created, e.g. as a cut edge, when the workpiece is cut off. The intention is to provide this workpiece surface with a coating material or an edge banding using the method according to the invention. The term coating material or edge banding extends broadly here, for example from material that is thinner than paper having, for example, 23 grammes/square meter weight per unit area up to edge bandings with a material thickness of several millimeters. Similarly, lacquers such as decorative lacquers may also be used as coating material. Coating materials or edge bandings with a low material thickness, which are used preferentially according to the invention, are widely provided as a strip wound onto a roll.

The workpiece surface of the workpiece provided is improved by applying at least a first curable liquid which is at least partially cured in a next process step. The object of the liquid is to form a layer on the narrow workpiece side of the workpiece which smoothes out the unevenness or roughness of the workpiece surface and enables the adherence of an adhesive or glue for the application of the edge banding or enables direct application of an edge banding. This liquid is preferably a lacquer and/or an adhesive which provides an improvement in the properties of the workpiece surface, in particular by filling in pores and unevenness. In addition, the surface is hardened by the lacquer and/or adhesive and prepared for the adherence of an adhesive and/or directly of an edge banding.

For the first time, the method offers the possibility of working with very thin coating materials and adhesive layers. In this way it is possible to achieve appealing coating results particularly cost-effectively using a small amount of material, i.e. edge banding material and adhesive. According to the invention, this result is facilitated in particular by exposure to energy, particularly by heating the workpiece and preparing the workpiece surface by pre-coating and smoothing.

Thermally activated adhesives are preferably used for gluing on the edge banding. Therefore, according to the invention, in the next process step the workpiece is heated at least on the workpiece surface and/or the edge banding prior to applying the edge banding. The edge banding preferably has a functional layer with a thermally activated adhesive. The adhesive is then activated on contact with the heated workpiece surface and/or is activated directly. For exposure to energy, in particular heating of the workpiece and/or the edge banding, a laser beam is preferably aimed at the liquid-coated workpiece surface and/or edge banding and guided in a path-like pattern, in particular in a loop or serpentine pattern over the liquid-coated workpiece surface. Guiding of the laser beam in, for example, a loop or serpentine pattern enables a particularly uniformly distributed input of energy over the surface.

In the next process step (or if necessary simultaneously or even in reverse order), the edge banding is applied to and pressed against the liquid-coated, heated workpiece surface. Pressing is carried out preferably by means of a roller which rolls along the edge banding and presses it against the workpiece surface.

According to a preferred development of the present invention, after the process step of providing the workpiece with the improved workpiece surface, a process step is provided involving a pretreatment for enhancing the adhesion and wetting properties, in particular for a preferred machining of at least a portion of the liquid-coated workpiece surface. The surface condition is improved as a result of the pretreatment, in particular the preferred machining (e.g. grinding off, milling, sawing, etc.). In particular, the surface becomes smoother as a result of the preferred machining (e.g. grinding off) and can also, if necessary, be shaped. Swellings due to absorption of the curable liquid are removed. The adhesion and wetting properties are thus improved.

The surface smoothness achieved is preferably improved in that the grinding off is carried out in a plurality of steps using an increasingly fine grain size. By grinding initially with a coarse grain size and subsequently finer grain size, grinding off can be carried out faster and a particularly smooth surface can be obtained. In the process and at the same time, a finer grain size is preferably used to grind off areas of the liquid-coated workpiece surface that have already been ground off using a coarser grain size while other areas of the liquid-coated workpiece surface are ground off using the finer grain size. This parallelization is easy to perform on a continuously advancing workpiece by means of grinding stations which work simultaneously. This enables the transit time to be shortened.

The pretreatment may preferably also have other removal methods in addition to grinding off. The pretreatment may also preferably include precleaning, degreasing, improvement of the adhesion and wetting properties and reduction of the electrostatic charge.

According to a preferred development of the present invention, prior to the process step of applying the edge banding, a process step may be provided for applying adhesive to the liquid-coated workpiece surface and/or edge banding. By applying adhesive, an edge banding without its own adhesive functional layer may be used or the adhesive functional layer may be strengthened in its adhesive effect. At the same time, an adhesive functional layer of the edge banding may also preferably react with the applied adhesive in the form of a multi-component adhesive.

Due to the pretreatment of the workpiece surface, it is possible to apply the adhesive preferably with a lower quantity of only 25-130 grammes per square meter workpiece surface. The low quantity of adhesive enables the edge banding to lie in particularly close and even contact on the liquid-coated workpiece surface.

According to a preferred development of the present invention, the applied edge banding has an adhesive layer which can be activated by the input of heat. For this, preferably prior to application of the edge banding, energy is introduced into the edge banding or the adhesive layer, in particular by means of at least one laser beam, in order to activate the adhesive. Preferably, the introduction of energy into the edge banding may also be effected by an energy source selected from the group comprising: laser, infra-red source, ultrasound source, magnetic field source, microwave source, plasma source and gassing source.

According to a preferred embodiment of the present invention, a second curable liquid is applied to the liquid-coated workpiece surface prior to grinding off and is cured. The first curable liquid is inexpensive but does not achieve the surface quality of the second liquid when cured. Therefore, the second layer of liquid is applied, said liquid when at least partially cured achieving the required surface quality but being more expensive. The required surface quality can be achieved within the necessary cost frame by using the two-layer construction employing the first liquid and the second liquid.

According to a development of the invention, it is further provided that the at least partially cured first liquid is at least partially activated by heating and that the coating is bonded to the first narrow surface by means of the activated first liquid. In this way it becomes possible to assign a dual function to the first liquid applied. On one hand, the curable first liquid serves to smooth out and harden the porous and uneven narrow surface of the workpiece, on the other hand the already partially cured first liquid can also be activated by heating (using an arbitrary energy source) such that it develops adhesive properties and ensures that the coating can be used with the narrow surface. In this case it is of particular advantage that an especially thin and barely visible joint is created between coating and workpiece which not only ensures a reliable joint but also an appealing appearance of the workpiece produced.

According to a preferred embodiment of the present invention, the edge banding is pressed on by a heated roller.

As a result, the heat required to activate the adhesive or at least a portion thereof can be emitted to the adhesive via the edge banding. In this case, energy input also takes place in direct proximity to the pressure point, i.e. where the maximum pressure is present between edge banding and workpiece. The result is the possibility of a particularly efficient introduction of energy.

Using the method according to the invention, preferably edge bandings with a weight per unit area of less than 25 grammes per square meter edge surface can also be processed. The special smoothing of the workpiece surface according to the invention, with the subsequently small amount of adhesive required for attachment of the edge banding makes it possible that no unevenness shows up on the visible surface even with such thin edge bandings.

The above and other objects, features and advantages of the present invention will become easier for the person skilled in the art to understand from the following detailed description of preferred embodiments of the present invention, which are executed in conjunction with the associated drawings. In the figures, the same or corresponding elements are referred to using the same reference numbers. The invention is not restricted to the embodiments described in the following section.

DETAILED DESCRIPTION OF PREFERRED EMBODIMENTS

Preferred embodiments of the invention will be described in detail in the following with reference to the associated drawings. The method according to the invention is used primarily for coating preferably flat workpieces, which, for example, consist at least in certain portions of wood, wood-based materials, plastic or the like although the present invention is not restricted hereto.

Figure 1:
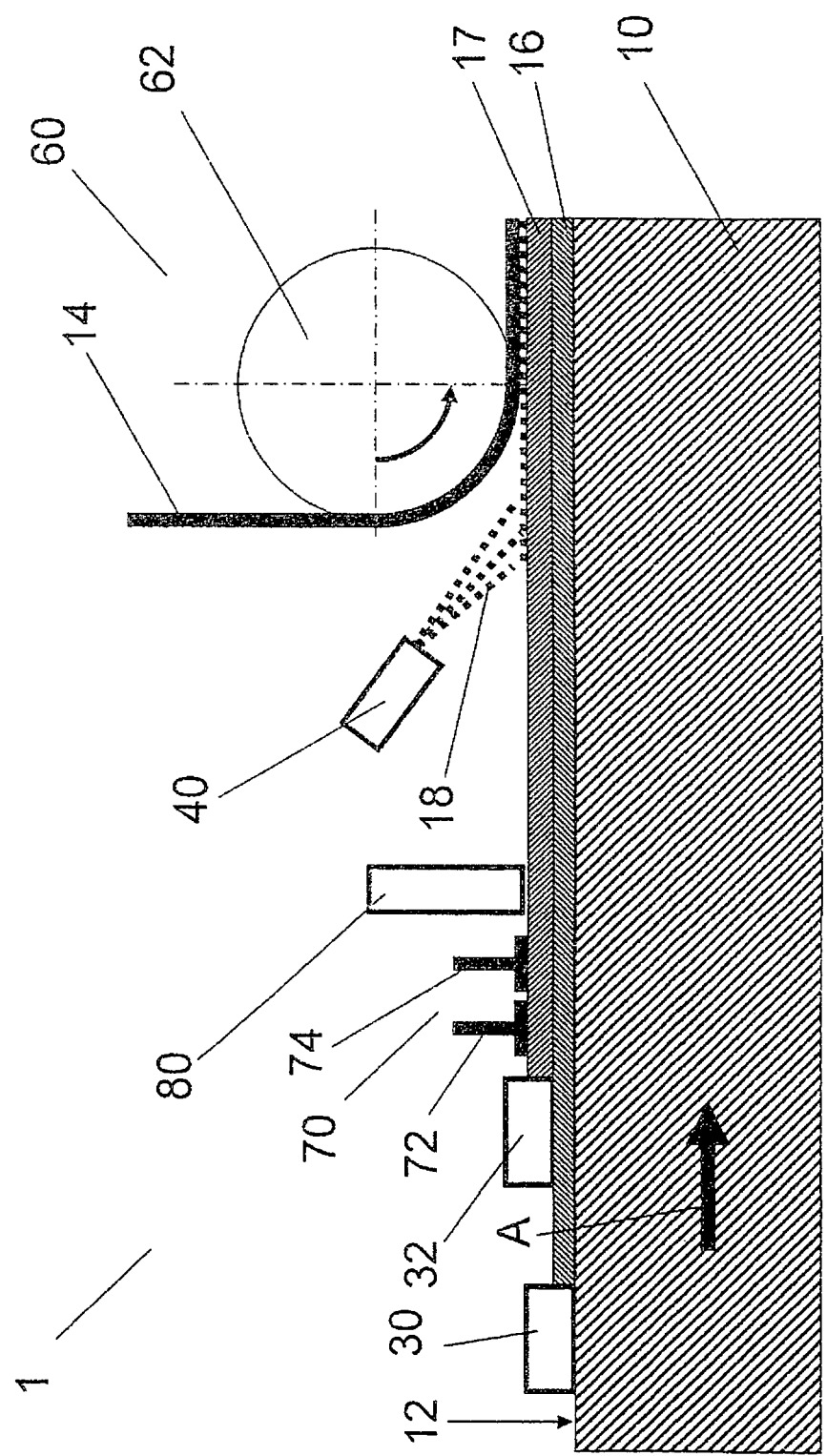
FIG. 1 is a schematic plan view of the operational steps of the method according to the invention for coating preferably flat workpieces on a corresponding system according to a first exemplary embodiment.

FIG. 1 is a schematic plan view of the operational steps of the method according to the invention for coating preferably flat workpieces 10 on a corresponding system 1 according to a first exemplary embodiment.

A flat workpiece 10 is fed into a system 1 for coating flat workpieces 10 in the direction of arrow A. Workpiece 10 has a workpiece surface 12 shown on the side uppermost in the diagram. In the present embodiment, workpiece surface 12 has a rather more porous basic structure to the cut surface which is to be improved and provided with an edge banding 14.

The processing sequence of workpiece surface 12 is illustrated running from left to right in the diagram. For better understanding, the process steps of improving workpiece surface 12 are also illustrated. First of all, a first liquid coating unit 30 shown as a rectangle is used to apply a first curable liquid 16 to workpiece surface 12 to improve it. First curable liquid 16 may basically be any type of curable liquid, for example it may also be lacquer or the like, whereby the liquids may also be viscous in the sense of a curable compound. "Liquid" is to be understood in this respect as a physical state and therefore as a distinction between "solid" or "gaseous".

However, within the scope of the present invention, an adhesive is preferably used, for example a hot-melt adhesive. The adhesive not only fills possible pores or other microstructural weak points in the workpiece but the individual elements or particles of the open workpiece surface are also bonded together such that the workpiece is stabilised overall. Within the scope of the invention, the most varied constructions, such as roller, nozzle, scraper, etc. and combinations hereof, qualify as liquid coating unit 30.

First curable liquid 16 applied to workpiece surface 12 is shown in the diagram as a hatched layer along workpiece surface 12. It should be noted that first curable liquid 16, depending on the nature (e.g. porosity) of workpiece surface 12, soaks into said surface and may possibly project only very slightly or—unlike the exemplary representation in FIGS. 1 to 3—may not project at all above workpiece surface 12.

After at least partial curing of first liquid 16, improvement of workpiece surface 12 is complete and in this embodiment a second curable liquid 17 is applied to liquid-coated workpiece surface 12 of workpiece 10 that has been coated with first curable liquid 16. A second liquid coating unit 32 is used for this purpose. Therefore a layer structure is created from workpiece 10, layer 16 of the first curable liquid and layer 17 of the second curable liquid.

In the subsequent work step, shown further to the right in the diagram, grinding off of liquid-coated workpiece surface 12 is carried out, that is layer 17 of the second curable liquid is ground off. In this embodiment, grinding off takes place in stages using a grinding unit 70 which has a first grinding station 72 and a second grinding station 74. First grinding station 72 and second grinding station 74 work in parallel. In this case, first grinding station 72 uses a coarser grain size than second grinding station 74. At the same time, both grinding stations 72, 74 are arranged sequentially in relation to feed direction A of workpiece 10 such that second grinding station 74 with the finer grain size grinds off the areas of liquid-coated workpiece surface 12 that were previously ground off by first grinding station 72 using the coarser grain size.

Workpiece surface 12 which has thus been twice coated with liquid and ground off is then heated in the present embodiment using an energy source 80 whereby it is also possible to work without heating the workpiece. In this embodiment, energy source 80 is executed as an array of infra-red emitters. Energy source 80 may also alternatively or additionally be designed to improve the surface properties of the workpiece, for example to reduce the surface tension.

As illustrated further to the right of the diagram, adhesive 18 is subsequently applied to liquid-coated workpiece surface 12. The adhesive is applied by means of an adhesive application device 40. Following this, a flexible edge banding 14 is applied to workpiece surface 12, which is coated with first curable liquid 16, second curable liquid 17 and adhesive 18, and is pressed on using a roller 62 and an edge banding application and pressing device 60.

Initially, workpiece surface 12 is not suitable for direct coating with flexible edge banding 14 which for cost efficiency and visual reasons is very thin; this is because workpiece surface 12 has a surface structure which is too uneven and porous. Unevenness of workpiece surface 12 would show through on the surface of bonded or glued on edge banding 14. Therefore, coating is carried out using first curable liquid 16 and in this embodiment also with second curable liquid 17. First curable liquid 16 is inexpensive but only achieves an average surface quality where applicable when cured. Therefore, in the present embodiment, second liquid layer 17 is applied which achieves a better surface quality than first liquid layer 16 but is more expensive. The required surface quality can be achieved within the necessary cost frame by using the two-layer construction employing first liquid 16 and second liquid 17.

Grinding unit 70 further improves the surface quality. In the process, the coarse unevenness is quickly removed from liquid-coated workpiece surface 12 using first grinding station 72. To smooth liquid-coated workpiece surface 12 further, grinding off is carried out using second grinding station 74 which employs a finer grain size and can therefore achieve a smoother surface finish. Since in this embodiment a temperature-activated adhesive 18 is used to stick edge banding 14 onto liquid-coated workpiece surface 12, preferably the next thing to take place is heating of liquid-coated workpiece surface 12 using an infra-red emitter 80 as the energy source.

Subsequently—or also, if appropriate, simultaneously and/or previously—adhesive 18 is applied to liquid-coated workpiece surface 12 using adhesive application device 40. Edge banding 14 is then applied by means of roller 62 to liquid-coated workpiece surface 12 with applied adhesive 18 and is pressed on. With this the coating process is complete.

The method according to the invention makes it possible to apply even very thin edge banding material, e.g. of 23 g/m2 edge banding material surface onto workpiece surfaces 12 which are rough prior to processing. To do this, workpiece surface 12 is provided successively in the present embodiment with a first curable liquid 16 and a second curable liquid 17. First curable liquid 16 is applied more thickly for this purpose; it is inexpensive, but only achieves a limited surface quality when cured. Therefore, in this embodiment, a second curable liquid 17 is applied which is more expensive than first curable liquid 16 but which when at least partially cured achieves a better surface quality for gluing on the edge banding.

Workpiece surface 12 thus twice coated with liquid is subsequently ground off. The use of a first grinding station 72 having a coarse grain size and a second grinding station 74 having a finer grain size makes it possible to quickly grind twice liquid-coated workpiece surface 12 smooth and despite this to achieve the high surface quality required for application of edge banding 14. Subsequent exposure to energy, in particular the heating of twice liquid-coated workpiece surface 12 enables the use of thermally activated adhesive 18. As the edge banding material itself is very thin and therefore has a low heat storage capacity, in this embodiment it is advantageous to heat liquid-coated workpiece surface 12 because it is better at storing the heat. Using the method according to the invention, it is also possible to glue on very thin edge bandings 14 inexpensively while at the same time achieving a high surface quality.

Figure 2:
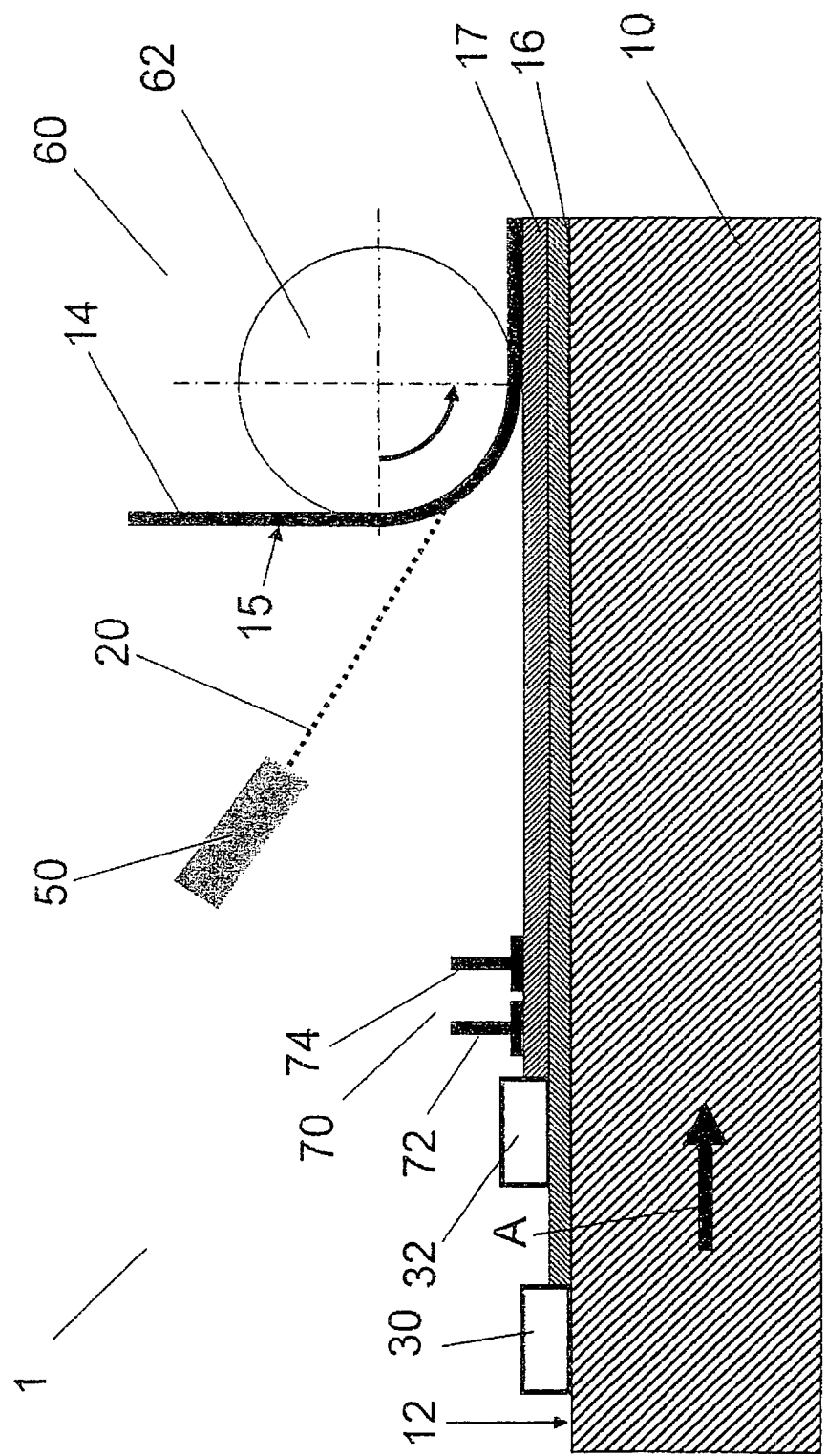
FIG. 2 is a schematic plan view of the operational steps of the method according to the invention for coating preferably flat workpieces on a corresponding system according to a second exemplary embodiment.

FIG. 2 is a schematic plan view of the operational steps of the method according to the invention for coating preferably flat workpieces on a corresponding system according to a second exemplary embodiment. The elements illustrated in FIG. 2 correspond substantially to those of FIG. 1. Reference is therefore made to FIG. 1, and in the following section only the special features of the embodiment according to FIG. 2 are explained as compared to those of FIG. 1. According to this embodiment, an edge banding 14 is used which is provided with a functional layer 15 which sticks when thermally activated. A laser 50 with which edge banding 14 is irradiated is provided for thermal activation. Bonding of edge banding 14 with liquid-coated workpiece surface 12 takes place by pressing edge banding 14, which is heated by laser beam 20, with its functional layer 15 against liquid-coated workpiece surface 12. Therefore, in this embodiment, adhesive application device 40 is not provided for application of adhesive 18 and adhesive application is omitted as a process step.

Figure 3:
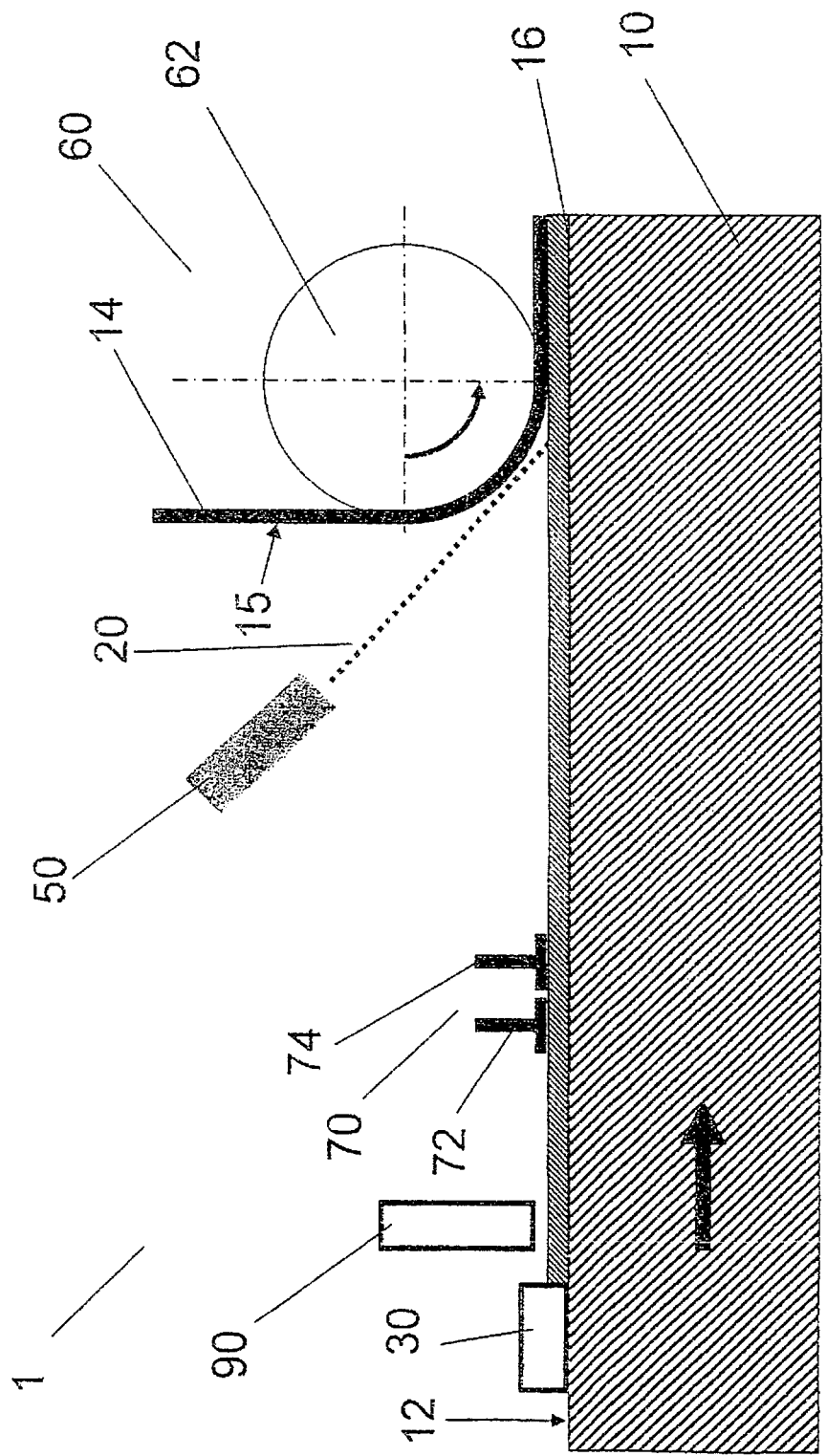
FIG. 3 is a schematic plan view of the operational steps of the method according to the invention for coating preferably flat workpieces on a corresponding system according to a third exemplary embodiment.

A further preferred embodiment of the method according to the invention or the equipment according to the invention is illustrated schematically in a view from above in FIG. 3. This links in turn to the first embodiment shown in FIG. 1 but differs from it initially in that first curable liquid or adhesive 16 applied by means of liquid coating unit 30 is at least partially cured by means of a UV radiation source or another suitable energy source. Subsequently, at least partially cured adhesive layer 16 is processed by means of grinding stations 72 and 74 whereby sizing and shaping of narrow surface 12 may also take place in the course of this processing.

Following this, adhesive layer 16 is exposed to energy immediately prior to the application of coating 14 by means of energy source 50, which in the present embodiment is executed as a laser irradiation device, such that adhesive layer 16 is activated, i.e. develops at least partially adhesive properties.

Immediately thereafter, coating or edge banding 14 is pressed onto activated adhesive layer 16 by means of pressure roller 62 and in this way is bonded to narrow surface 12 of workpiece 10.

Although not illustrated in the Figures, instead of an edge banding material any other coating may be applied to the workpiece, for example in the form of a lacquer or any other face layer.

The invention claimed is:

1. A method for coating flat workpieces, which consist at least in certain portions of wood, wood-based materials, or plastic, with the following process steps:
   (a) provision of a workpiece having at least one workpiece surface, wherein the workpiece surface has a porous basic structure, in which the workpiece surface is refined by the application of at least a first curable liquid on the workpiece surface and at least partial curing of the first liquid to form a liquid-coated workpiece surface; wherein a plurality of the pores of the porous basic structure are filed by the first curable liquid; and wherein the first curable liquid is a lacquer;
   (b) pretreating the liquid-coated workpiece surface for improving the adhesive and wetting properties by grinding off at least a portion of the liquid-coated workpiece surface;
   (c) after said pretreating, heating of at least the workpiece surface and/or of an edge banding which is applied to the work piece surface; and
   (d) applying an edge banding on the liquid-coated workpiece surface and pressing of the edge banding onto the liquid-coated workpiece surface, and
   (e) wherein the curable liquid is at least partially cured by the input of UV radiation energy.

2. The method according to claim 1, wherein
   grinding off of at least a portion of the liquid-coated workpiece surface grinding in a plurality of steps using an increasingly fine grain size and/or in a shaping manner.

3. The method according to claim 2, wherein
in process step (b), at the same time using a finer grain size, areas of the liquid-coated workpiece surface are ground off which have already been ground off using a coarser grain size, while other areas of the liquid-coated workpiece surface are ground off using the finer grain size.

4. The method according to claim 1, wherein
prior to the process step (d) of applying the edge banding, a process step (t) takes place for applying adhesive to the liquid-coated workpiece surface and/or edge banding.

5. The method according to claim 4, wherein
the adhesive is applied with a quantity of 25-30 grams per square meter on the liquid-coated workpiece surface.

6. The method according to claim 1, wherein
the edge banding applied in process step (d) has an adhesive layer which is activated by the input of heat.

7. The method according to claim 6, wherein
prior to process step (d), a process step of an introduction of energy into the coating or an adhesive layer takes place using an energy source selected from the group consisting of: laser, infra-red source, ultrasound source, magnetic field source, microwave source, plasma source and gassing source.

8. The method according to claim 1, wherein
the at least partially cured first liquid is at least partially activated by heating and that the edge banding is bonded to the workpiece surface by means of the activated first liquid.

9. The method according to claim 1, wherein
the heating of the workpiece and/or of the edge banding in process step (c) takes place using an energy source which is selected from the group consisting of: laser, infra-red source, ultrasound source, magnetic field source, microwave source, plasma source and gassing source.

10. The method according to claim 1, wherein
in process step (d), pressing on of the edge banding is performed by means of a heated roller.

11. The method according to claim 1, wherein
in process step (d), the edge banding has a weight per unit area of less than 25 grammes per square meter edge banding surface.

* * * * *